(12) United States Patent
Levene et al.

(10) Patent No.: US 8,391,439 B2
(45) Date of Patent: Mar. 5, 2013

(54) DETECTOR ARRAY FOR SPECTRAL CT

(75) Inventors: Simha Levene, Saad (IL); Olga Shapiro, Haifa (IL); Ami Altman, Tel-Aviv (IL); Naor Wainer, Zichron Yaakov (IL)

(73) Assignee: Koninklijke Philips Electronics N.V., Eindhoven (NL)

( * ) Notice: Subject to any disclaimer, the term of this patent is extended or adjusted under 35 U.S.C. 154(b) by 861 days.

(21) Appl. No.: 11/912,672

(22) PCT Filed: Apr. 6, 2006

(86) PCT No.: PCT/IB2006/051062
§ 371 (c)(1),
(2), (4) Date: May 10, 2010

(87) PCT Pub. No.: WO2006/114715
PCT Pub. Date: Nov. 2, 2006

(65) Prior Publication Data
US 2010/0220833 A1    Sep. 2, 2010

Related U.S. Application Data

(60) Provisional application No. 60/674,905, filed on Apr. 26, 2005.

(51) Int. Cl.
*H05G 1/64*    (2006.01)
*H01L 27/146*    (2006.01)

(52) U.S. Cl. ............ 378/5; 378/19; 378/98.8; 378/98.9; 250/370.09

(58) Field of Classification Search .................. 378/4, 5, 378/19, 62, 91, 98, 98.8, 98.9, 204, 210; 250/370.01, 370.08, 370.09
See application file for complete search history.

(56) References Cited

U.S. PATENT DOCUMENTS

| | | | |
|---|---|---|---|
| 4,247,774 A | 1/1981 | Brooks | |
| 4,398,092 A | 8/1983 | Carlson | |
| 4,870,667 A | 9/1989 | Brunnett et al. | |
| 4,982,095 A | 1/1991 | Takahashi et al. | |
| 5,013,921 A | 5/1991 | Bruening et al. | |
| 5,138,167 A | 8/1992 | Barnes | |
| 5,227,633 A | 7/1993 | Ryuo et al. | |
| 5,440,129 A | 8/1995 | Schmidt | |
| RE37,536 E | 2/2002 | Barnes | |
| 6,445,765 B1 | 9/2002 | Frank et al. | |
| 6,448,559 B1 | 9/2002 | Saoudi | |
| 7,379,528 B2 | 5/2008 | Mattson et al. | |
| 2004/0113085 A1 | 6/2004 | Heismann et al. | |
| 2004/0159792 A1 | 8/2004 | Andreaco et al. | |
| 2006/0067472 A1* | 3/2006 | Possin et al. | 378/98.9 |

FOREIGN PATENT DOCUMENTS

| | | |
|---|---|---|
| DE | 19711927 A1 | 9/1998 |
| GB | 2365522 A | 2/2002 |
| GB | 2404249 A | 1/2005 |
| JP | 5208000 A | 8/1993 |

(Continued)

*Primary Examiner* — Anastasia Midkiff (57) ABSTRACT

A radiation detector (24) includes a two-dimensional array of upper scintillators (30τ) which is disposed facing an x-ray source (14) to convert lower energy radiation events into visible light and transmit higher energy radiation. A two-dimensional array of lower scintillators (30$_B$) is disposed adjacent the upper scintillators (30τ) distally from the x-ray source (14) to convert the transmitted higher energy radiation into visible light. Upper and lower photodetectors (38τ, 30$_B$) are optically coupled to the respective upper and lower scintillators (30τ,30$_B$) at an inner side (60) of the scintillators (30τ,30$_B$). An optical element (100) is optically coupled with the upper scintillators (30τ) to collect and channel the light from the upper scintillators (30τ) into corresponding upper photodetectors (38τ).

23 Claims, 6 Drawing Sheets

FOREIGN PATENT DOCUMENTS

| | | | |
|---|---|---|---|
| WO | 03096070 | A1 | 11/2003 |
| WO | 2004061478 | A1 | 7/2004 |
| WO | 2004095068 | A1 | 11/2004 |
| WO | 2004104634 | A1 | 12/2004 |

* cited by examiner

DETECTOR ARRAY FOR SPECTRAL CT

CROSS REFERENCE TO RELATED APPLICATIONS

This application claims the benefit of U.S. provisional application Ser. No. 60/674,905 filed Apr. 26, 2005, which is incorporated herein by reference.

The present application relates to the use of imaging systems. The application subject matter finds particular application in spectral computed tomography (CT) scanners and will be described with particular reference thereto. However, the invention finds use in connection with DF and RF imaging, x-ray fluoroscopy, radiography, and other imaging systems for medical and non-medical examinations.

Computed tomography (CT) imaging typically employs an x-ray source that generates a fan-beam, wedge-beam, or cone-beam of x-rays that traverse an examination region. A subject arranged in the examination region interacts with and absorbs a portion of the traversing x-rays. A two-dimensional radiation detector including an array of detector elements is arranged opposite the x-ray source. The radiation detector includes the scintillator layer and an underlying photodetector layer which measure intensities of the transmitted x-rays. In a dual energy CT system, scintillation crystals are bonded to each of two respective photomultiplier tubes, e.g. a calcium fluoride (CaF) and sodium iodide (NaI). The two scintillators can be placed side by side, or, as shown in U.S. Pat. No. 4,247,774, the scintillators can be shaped to be partially overlapped such that some of the x-rays pass through both scintillators. Lower energy x-rays are absorbed in and cause scintillations in an upper CaF scintillator, while higher energy x-rays pass through to scintillate in the NaI scintillator. The scintillation gives rise to electrical currents in the corresponding photomultipliers.

Typically, the x-ray source and the radiation detector are mounted at opposite sides of a rotating gantry such that the gantry is rotated to obtain an angular range of projection views of the subject. In some configurations the x-ray source is mounted on the rotating gantry while the radiation detector is mounted on a stationary gantry. In either configuration, the projection views are reconstructed from the electrical signals using filtered backprojection or another reconstruction method to produce a three-dimensional image representation of the subject or of a selected portion thereof.

In dual energy CT systems, electrical signals corresponding to the higher and lower energy x-rays can be collected simultaneously and reconstructed into separate images that are inherently registered. The dual energy slice data can also be used to provide beam hardening corrections.

Some currently used CT detectors employ a gadolinium oxy sulfide (GOS) layer. In a spectral CT detector, the upper layer, which senses low energy x-rays, is typically configured to absorb a significant amount of x-ray photons with energy below 50 keV while transmitting a high amount of x-ray photons with energy above 90 keV. These criteria could be met with an upper layer of GOS thinner than approximately 0.1 mm. Typically, the active area of each photodetector is made to match the thickness of the corresponding scintillation layer. Because the light collection efficiency of the photodetector is directly proportional to the active area of the photodetector, a 0.1 mm high active area of photodetector would result in an inadequately low light collection efficiency.

The present invention contemplates an improved method and apparatus which overcomes the above-referenced problems and others.

In accordance with one aspect of the present application, a radiation detector is disclosed. An upper scintillator is disposed facing an x-ray source to receive radiation, convert lower energy radiation into light and transmit higher energy radiation. A first photodetector is optically coupled with the upper scintillator to receive and convert the light from the upper scintillator into electrical signals. An optical element is optically coupled with the upper scintillator and the first photodetector to collect and channel the light from the upper scintillator into the first photodetector. A lower scintillator is disposed adjacent the upper scintillator distally from the x-ray source to convert the higher energy radiation transmitted through the upper scintillator into light. A second photodetector is optically coupled with the lower scintillator to receive and convert the light from the lower scintillator into electrical signals.

In accordance with another aspect of the present application, a method of manufacturing a radiation detector is disclosed. Upper and lower scintillators are fabricated on light sensitive faces of upper and lower photodetectors. An optical element is coupled to the upper scintillator. The optical element and the upper scintillator are optically coupled to the upper photodetector. The lower scintillator is optically coupled to the lower photodetector.

One advantage of the present application resides in providing cost effective radiation detectors.

Another advantage resides in providing high optical detection efficiency for spectral CT.

Another advantage resides in providing an X-ray detector whose x-ray spectral response is substantially invariant with temperature.

Yet another advantage resides in substantial improvement of the light collection efficiency for thin scintillators.

Numerous additional advantages and benefits will become apparent to those of ordinary skill in the art upon reading the following detailed description of the preferred embodiments.

The invention may take form in various components and arrangements of components, and in various process operations and arrangements of process operations. The drawings are only for the purpose of illustrating preferred embodiments and are not to be construed as limiting the invention.

Figure 1:
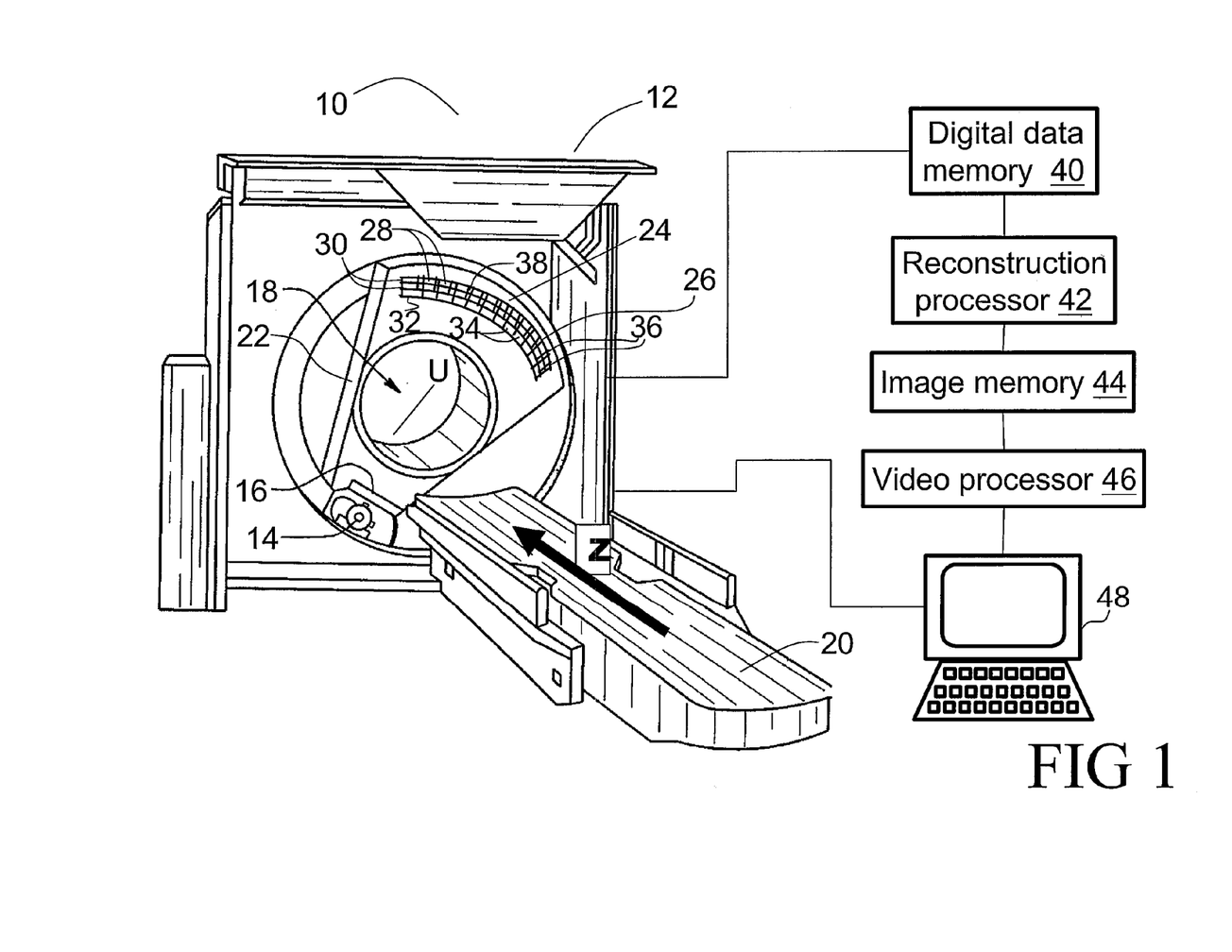
FIG. 1 is a diagrammatic illustration of an imaging system.

With reference to FIG. 1, a computed tomography (CT) imaging apparatus or CT scanner 10 includes a gantry 12. An x-ray source 14 and a source collimator 16 cooperate to produce a fan-shaped, cone-shaped, wedge-shaped, or otherwise-shaped x-ray beam directed into an examination region 18 which contains a subject (not shown) such as a patient arranged on a subject support 20. The subject support 20 is linearly movable in a Z-direction while the x-ray source 14 on a rotating gantry 22 rotates around the Z-axis.

Preferably, the rotating gantry 22 rotates simultaneously with linear advancement of the subject support 20 to produce a generally helical trajectory of the x-ray source 14 and collimator 16 about the examination region 18. However, other imaging modes can also be employed, such as a single- or multi-slice imaging mode in which the gantry 22 rotates as the subject support 20 remains stationary to produce a generally circular trajectory of the x-ray source 14 over which an axial image is acquired. After the axial image is acquired, the subject support optionally steps a pre-determined distance in the Z-direction and the axial image acquisition is repeated to acquire volumetric data in discrete steps along the Z-direction.

A radiation detector or detector array 24 is arranged on the gantry 22 across from the x-ray source 14. The radiation detector 24 includes a scintillation array 26 of scintillators or crystals 28. The scintillation array 26 is arranged in layers 30 and spans a selected angular range that preferably comports with a fan angle of the x-ray beam. The radiation scintillation array 26 also extends along the Z-direction to form a matrix of n×m scintillators, such as 16×16, 32×32, 16×32, or the like. The layers 30 of the scintillation array 26 are stacked in the direction generally perpendicular to the Z-direction. The radiation detector 24 acquires a series of projection views as the gantry 22 rotates. It is also contemplated to arrange the radiation detector 24 on a stationary portion of the gantry encircling the rotating gantry such that the x-rays continuously impinge upon a continuously shifting portion of the radiation detector during source rotation. An anti-scatter grid 32 is arranged on a radiation receiving face of the scintillation array 26. The grid 32 has apertures 34 which permit passage of radiation. An array or arrays 36 of photodiodes or other photodetectors 38 is optically coupled to each of the scintillators 28 of the scintillator array 26 to form a detector element or dixel.

A reconstruction processor 42 reconstructs the acquired projection data from a digital data memory 40, using filtered backprojection, an n-PI reconstruction method, or other reconstruction method, to generate a three-dimensional image representation of the subject or of a selected portion thereof which is stored in an image memory 44. The image representation is rendered or otherwise manipulated by a video processor 46 to produce a human-viewable image that is displayed on a user interface 48 or another display device, printing device, or the like for viewing by an operator.

The user interface 48 is additionally programmed to interface a human operator with the CT scanner 10 to allow the operator to initialize, execute, and control CT imaging sessions. The user interface 48 is optionally interfaced with a communication network such as a hospital or clinic information network via which image reconstructions are transmitted to medical personnel, a patient information database is accessed, or the like.

Figure 2:
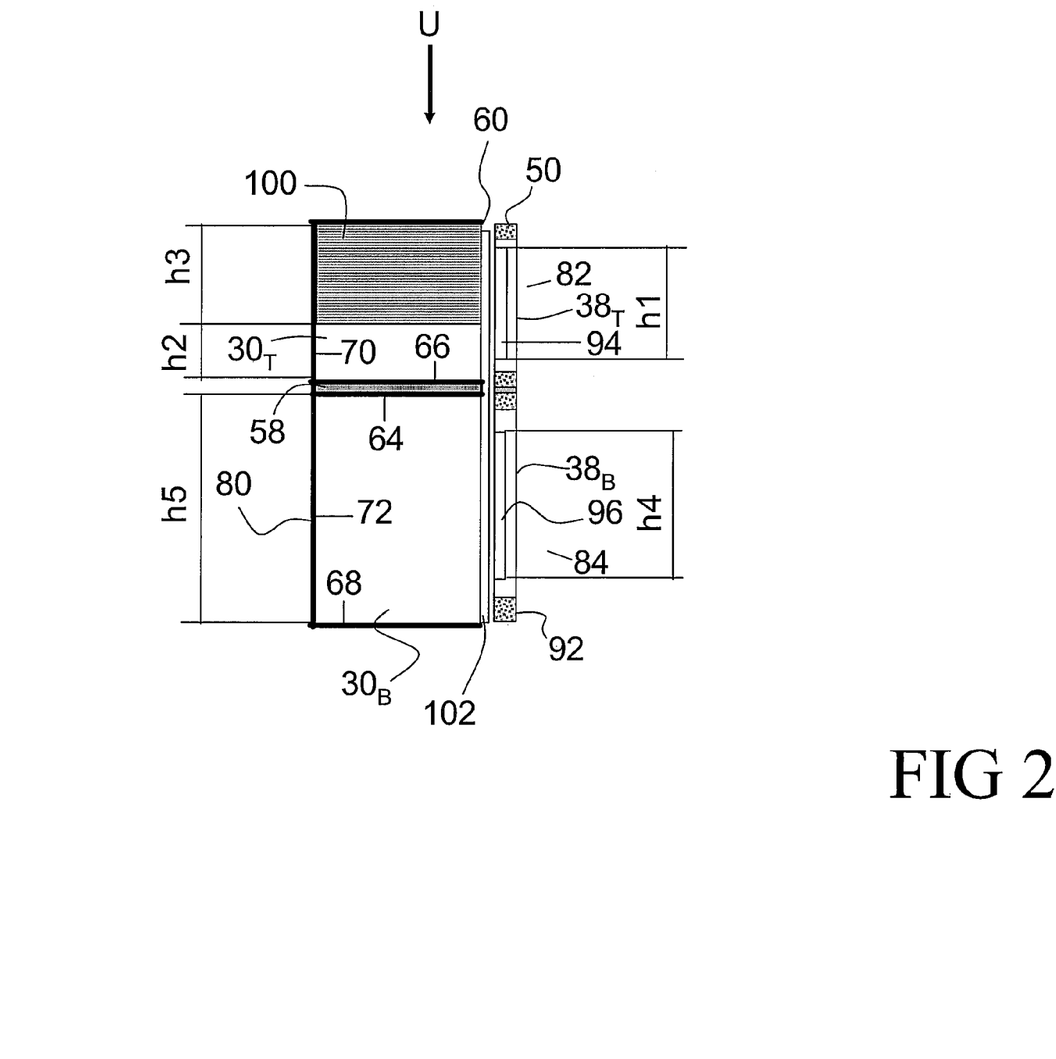
FIG. 2 diagrammatically illustrates a portion of a radiation detector.

With reference to FIG. 2, the scintillation array 26 includes a double decker array which includes a bottom or lower scintillation layer $30_B$ and a top or upper scintillation layer $30_T$, which are separated by a layer 58. The photodetector array 36 of the photodetectors 38, such as silicon photodetectors, amorphous silicon, charge-coupled devices, CMOS, or other semiconductor photodetectors is in optical communication with the scintillation array 26. More specifically, the photodetectors include a photosensitive layer with an array of active areas and, preferably, an analog second layer integrally formed on a chip 50.

X-rays, which have passed through the examination region 18, strike the top of the top scintillation layer $30_T$ along a direction U. The top scintillation layer $30_T$, which is closest to the X-ray source 14, converts the softest or lowest energy x-rays in the beam, which has passed through the examination region 18, into light. The bottom scintillation layer $30_B$, which is furthest from the X-ray source, receives the hardest x-rays. Light signals from the dixels of each layer 30 are detected by the corresponding photodetectors 38 of the photodetector array 36. The top layer $30_T$ is selected and sized to convert substantially all x-ray photons of 50 keV or less into light and pass substantially all photons 90 keV or higher to the bottom layer $30_B$.

The photodetector array 36 is arranged vertically along the direction U on the inner side 60 of each double-decker array 26. The inner side 60 of the top and bottom scintillation layers $30_T$, $30_B$, which is adjacent the photodetectors 38, is optically coupled to communicate light to the photodetector array 36. An optical adhesive epoxy cement 102 may be used to achieve the optical coupling. The reflective coating 80 can function as the separation layer 58.

Figure 3:
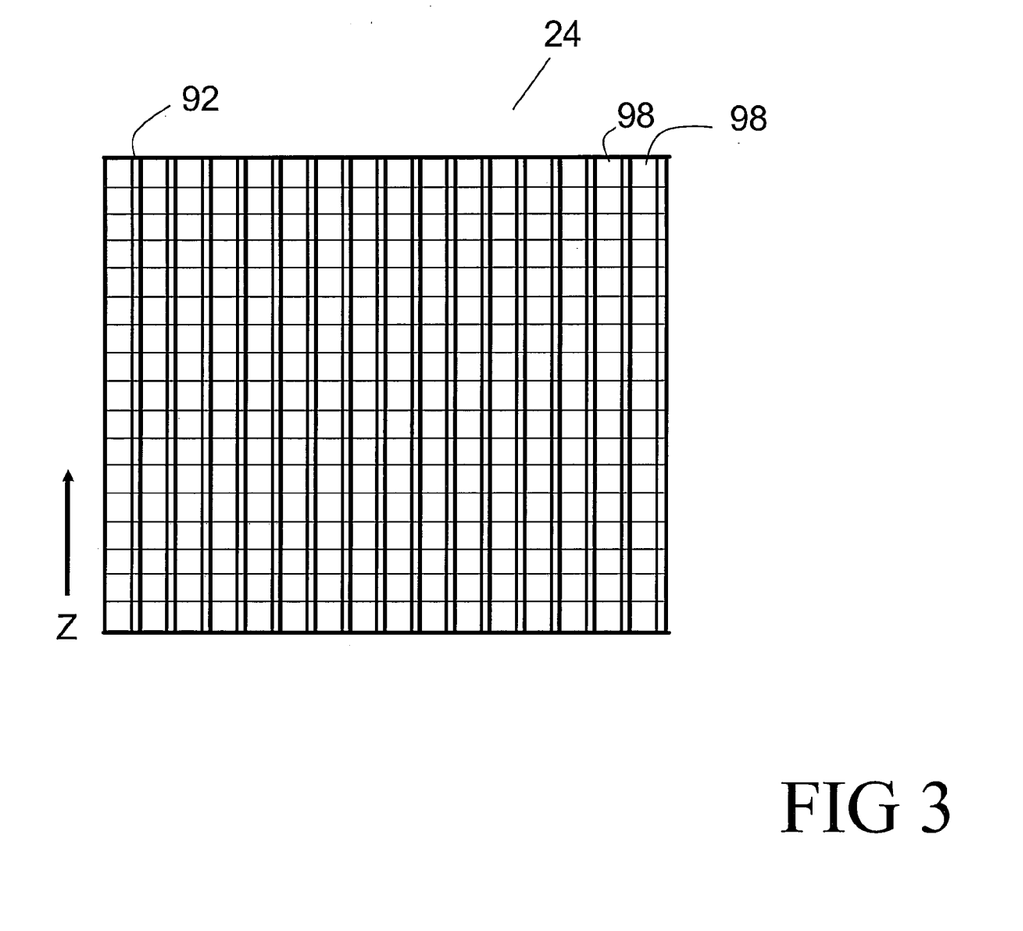
FIG. 3 diagrammatically illustrates a top view of a portion of a radiation detector.

With continuing reference to FIG. 2 and further reference to FIG. 3, the photodetector array 36 is preferably a 2D array including upper and lower photodetector arrays 82, 84, both part of the vertical chips 50. Each silicon chip 50 includes a pair of respective upper and lower photodetectors $38_T$, $38_B$. An active area 94 of each upper photodetector $38_T$ is disposed opposite and coupled to the top scintillation layer $30_T$, while an active area 96 of each lower photodetector $38_B$ is disposed opposite and coupled to the bottom scintillation layer $30_B$. The silicon chips 50 are mounted parallel to each other preferably in the Z-direction, between adjacent rows of the scintillation array 26. Each chip and the scintillators it carries form a linear tile 98. The chips form x-ray insensitive zones 92; therefore, each is preferably thin, i.e. 0.1 to 0.15 mm.

In one embodiment, the upper and lower photodetectors $38_T$, $38_B$ can be back-contact photodiodes and have respective active areas 94, 96 that are sensitive to the radiation produced by scintillation. Front surface photodetectors, such as photodiodes or charge-coupled devices (CCDs), with electrical contacts preferably disposed on their front surface, detect the light and convert it to electrical signals which are passed by conductors on the front surface of said chip to connectors below the bottom scintillator. Other detectors which convert the light by back illumination are also contemplated.

Electronics, such as application-specific, integrated circuits (ASICs) (not shown), produce electrical driving outputs for operating the photodetector array 36, and receive detector signals produced by the photodetector array 36. The ASICs perform selected detector signal processing which results in the conversion of photodetector currents to digital data.

The signals from the dixels of each layer 30 are weighted and combined to form spectrally weighted image data. The weighting may include zeroing one or more of the dixel layers. By selecting different relative weighting among the dixels, image data is generated which emphasizes and deemphasizes selected portions of the energy spectrum, i.e. selected x-ray energy absorption ranges. By appropriately selecting the weighting, CT images are reconstructed of specific selected x-ray energy absorption ranges to emphasize tissues while other selected tissues are superseded or substantially erased in the reconstructed image. For example, calcium in mammary tissue, and iodine in a contrast medium can be emphasized by subtracting images or signals from individual dixels weighted to emphasize either side of the respective absorption lines. Although two layers are illustrated, it should be appreciated that a larger number of layers can be provided to provide more levels of energy discrimination.

With continuing reference to FIG. 2, in one embodiment, the top and the bottom scintillation layers $30_T$, $30_B$ are made from the same scintillation material. The top scintillation layer $30_T$ is thin compared to the bottom scintillation layer $30_B$ in order to sense lower energy x-rays and transmit higher energy x-rays. For example, the top scintillation layer $30_T$ must absorb x-rays of the energy below 50 keV, while transmitting 75% or more of the x-rays of the energy above 90 keV. In one embodiment, GOS is used to manufacture both top and bottom scintillation layers $30_T$, $30_B$. In such a detector, the absorption and transmission criteria can be met with the top scintillation layer $30_T$ of GOS thinner than approximately 0.5 mm and the bottom scintillation layer $30_B$ thickness from about 1.3 mm to about 2.0 mm. Typically, the photodetectors active areas 94, 96 are made to match respective thicknesses of the top and bottom scintillation layers $30_T$, $30_B$.

The light collection efficiency $L_{Col\text{-}eff}$ of a detector comprising a transparent, non-scattering, painted scintillator optically coupled to the active area of the photodetector is directly proportional to the active area $A_A$ of the photodetector and may be roughly expressed as:

$$L_{Col\text{-}eff} = \frac{A_A(1 - R_{Si})}{A_P(1 - R_P) + (A_A + A_D)(1 - R_{Si})},$$

where $A_A$, $A_D$ are the "Active" and "Dead" areas of the photodetector, $R_{si}$ is the photodetector's diffuse reflectance at the wavelength of the scintillator emission, and $A_P$, $R_P$ are the area and the diffuse reflectance respectively of the painted areas of the scintillator crystal.

For example, for a scintillator of 1 mm×1 mm cross-sectional area, which has about 95% reflective coating, the light collection efficiency $L_{Col\text{-}eff}$ is equal to about 75% when the thickness of the scintillation layer is equal to about 1.5 mm. When the thickness of the scintillation layer for the same scintillator is reduced to about 0.25 mm, the light collection efficiency $L_{Col\text{-}eff}$ is reduced to about 15% because very little amount of the emitted light shines unto the active area of the photodetector.

A rectangular block or prism 100 of transparent, low-Z plastic light guide material such as PMMA (Perspex™), poly ethylene terephthalate (PET), polystyrene, polycarbonate (Lexan), cast epoxy and the like, is optically coupled to a top surface 62 of each top scintillator $30_T$ element in the array. Alternately, or additionally, a bottom surface of the scintillator is optically coupled to the transparent prism. Top surface 64 of the bottom scintillator $30_B$, the bottom surfaces 66, 68 and side surfaces 70, 72 of the top and bottom scintillation layers $30_T$, $30_B$ and a top surface 112 of the prism IDO are painted or otherwise covered with a light-reflective coating or layer 80. The reflective coating 80 covers the prism and the scintillator as a unit. The light emitted by, the top scintillation layer $30_T$ is carried to the top photodetector in part through the scintillator layer and in part through the prism. There is no reflective coating deposited between the scintillator and the prism 100. The height of the active area 94 of the upper photodetector $38_T$, which is substantially equal to the sum of the heights of the top scintillator $30_T$ and the prism or block 100, is equal to a height h1, which is substantially greater than a thickness or height h2 of the associated top scintillation layer $30_T$. Such increased active area of the photodetector results in increased optical collection efficiency. In one embodiment, the height h2 of the top layer $30_T$ is equal to about 0.10 mm, a height h3 of the prism 100 is equal to about 0.90 mm, and the height h1 of the upper photodetector active area 94 is equal to about 1.00 mm. The optical collection efficiency $L_{col\text{-}eff}$ of the upper photodetector $38_T$ is increased by about a factor of four without detracting from the light collected by the lower photodetector active area 96 of a height h4 which is equal to about 0.95 mm. A height h5 of the bottom scintillation layer $30_B$ in the illustrated embodiment is equal to about 1 mm.

Preferably, the height of the block or prism 100 is chosen to equalize the active areas of the upper and lower photodetectors $38_T$, $38_B$.

Preferably, an optical coupling material, such as an optical coupling cement 102, is disposed between the inner side 60 and the photodetectors to improve optical coupling between the scintillation layers $30_T$, $30_B$ and the photodetector array 36, and increase the light collection efficiency of the photodetectors $38_T$, $38_B$.

Because both the bottom scintillation layer $30_B$ and the top scintillation layer $30_T$ may now be made of the same scintillation material, the manufacturing costs are reduced as only a single component supply chain must be established and maintained. The image quality is also improved, because the scintillator pairs in each dixel now have identical x-ray response temperature coefficients. This reduces the need to recalibrate spectral response when the detector array warms up during protracted imaging.

Figure 4:
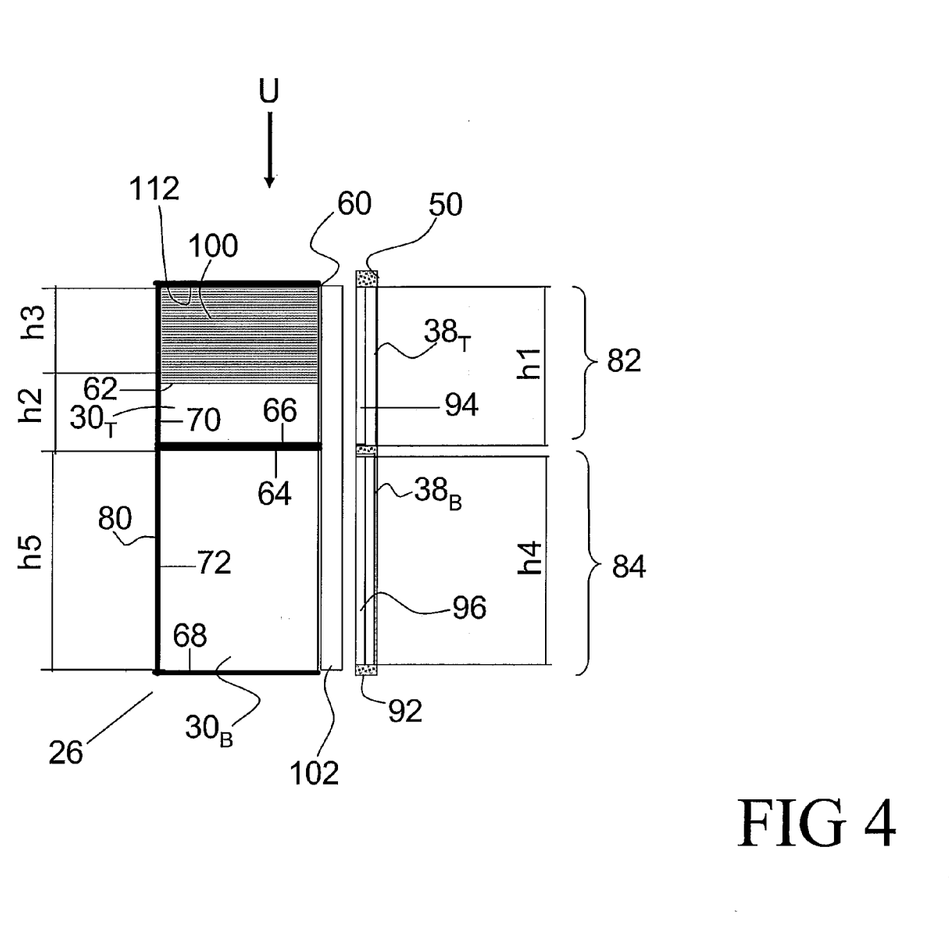
FIG. 4 diagrammatically illustrates a portion of an alternate embodiment of a radiation detector.

With reference to FIG. 4, the lower scintillation layer $30_B$ comprises a dense, high-Z material such as gadolinium oxy sulfide ($Gd_2O_2S$, Pr, Ce or "GOS") or cadmium tungstate ($CdWO_4$ or "CWO"), while the upper scintillation layer $30_T$ comprises either a high-Z or a low-Z material such as zinc selenide (ZnSe), which is, preferably, doped with tellurium (Te). In this embodiment, the zinc selenide scintillator layer is about 1.5 mm thick and the prism, if used, is about 0.5 mm or less thick. Alternatively, the upper layer $30_T$ comprises, yttrium aluminum garnet ("YAG"), or other like material which provides a small x-ray absorption such that only soft x-rays in the beam are absorbed. In the yttrium aluminum garnet embodiment, the scintillator layer is about 1.0 mm thick and the prism about 0.5 mm or less thick. As another alternative, combinations of scintillators can be utilized such as an 0.5 mm layer of YAG, a 0.05 mm layer of GOS, and a 0. 5 mm prism. As yet another alternative, the prism can be a scintillator, e.g. a 0.75 mm layer of ZnSe with a 0.05 mm of GOS. Numerous other scintillators and combinations are contemplated.

Figure 5:
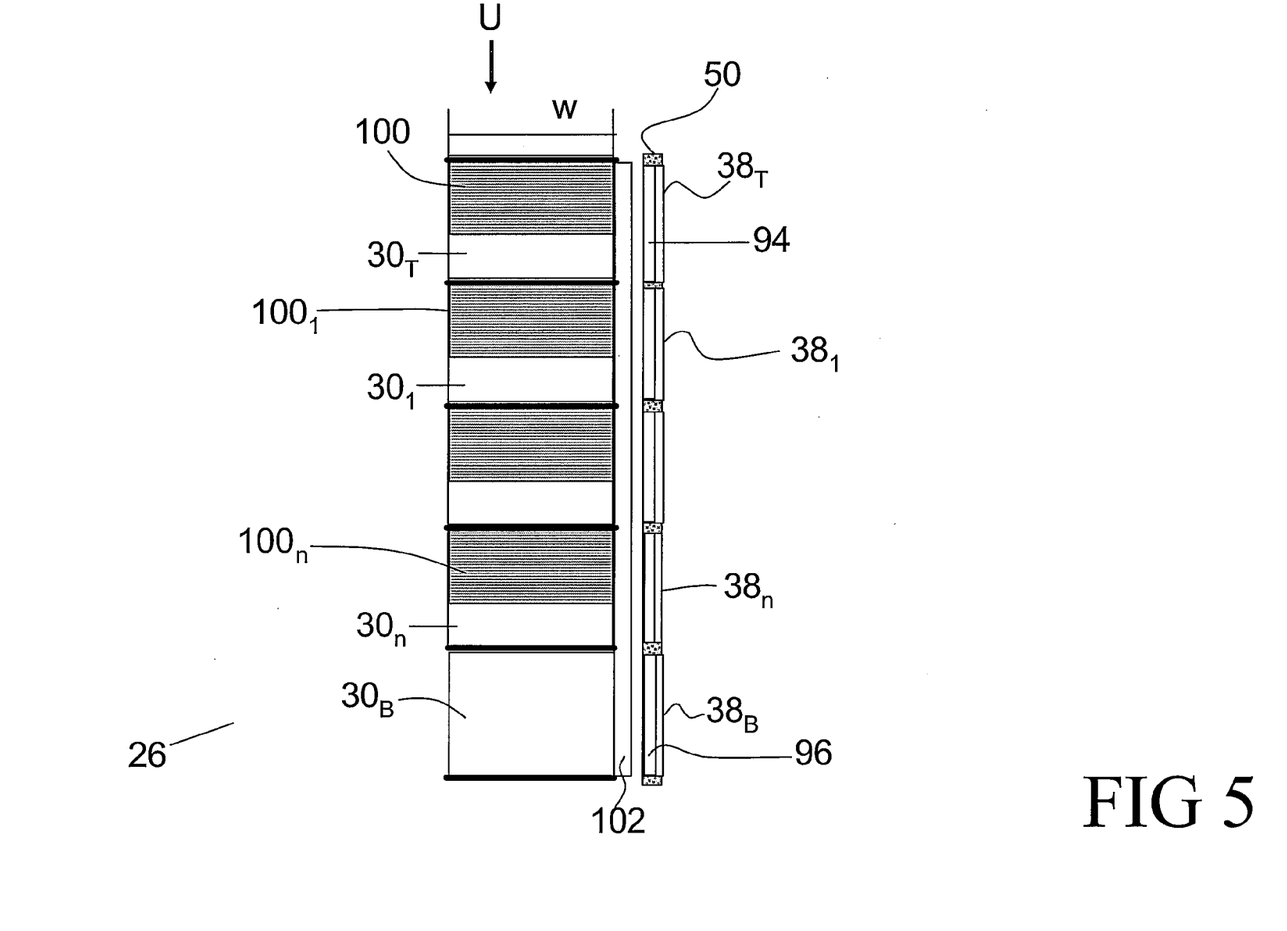
FIG. 5 diagrammatically illustrates a portion of a radiation detector which includes multiple layers of scintillators.

With reference to FIG. 5, the scintillation array 26 includes intermediate scintillation layers $30_1$, $30_2$, . . . , $30_n$ which are disposed between the top and bottom scintillation layers $30_T$, $30_B$. Preferably, only the bottom layer $30_B$ is generally thick, while each layer above the bottom layer $30_B$ is preferably relatively thin and responds only to a small range of the x-ray spectrum incident upon the respective intermediate layer. The remainder of the x-ray spectrum is passed onwards to the lower intermediate layers. Each intermediate scintillation layer $30_1$, $30_2$, . . . , $30_n$ is optically coupled to corresponding intermediate photodetector $38_1$, $38_2$, . . . , $38_n$. It is particularly advantageous to increase the optical height of all but the bottom layer $30_B$ by using optical prisms $100_1$, $100_2$, . . . , $100_n$ in the manner described above to channel light from each intermediate scintillation layer $30_1$, $30_2$, . . . , $30_n$ to the corresponding intermediate photodetector $38_1$, $38_2$, . . . , $38_n$. Typically, the height of the prism used in the layer n is selected such that a sum of the height of the prism and respective scintillation layer is roughly equal to a width w of (FIG. 2 modified) the scintillators $30_T$, $30_B$, thus ensuring an acceptable ratio of photodetector active area to total painted area.

Figure 6A:
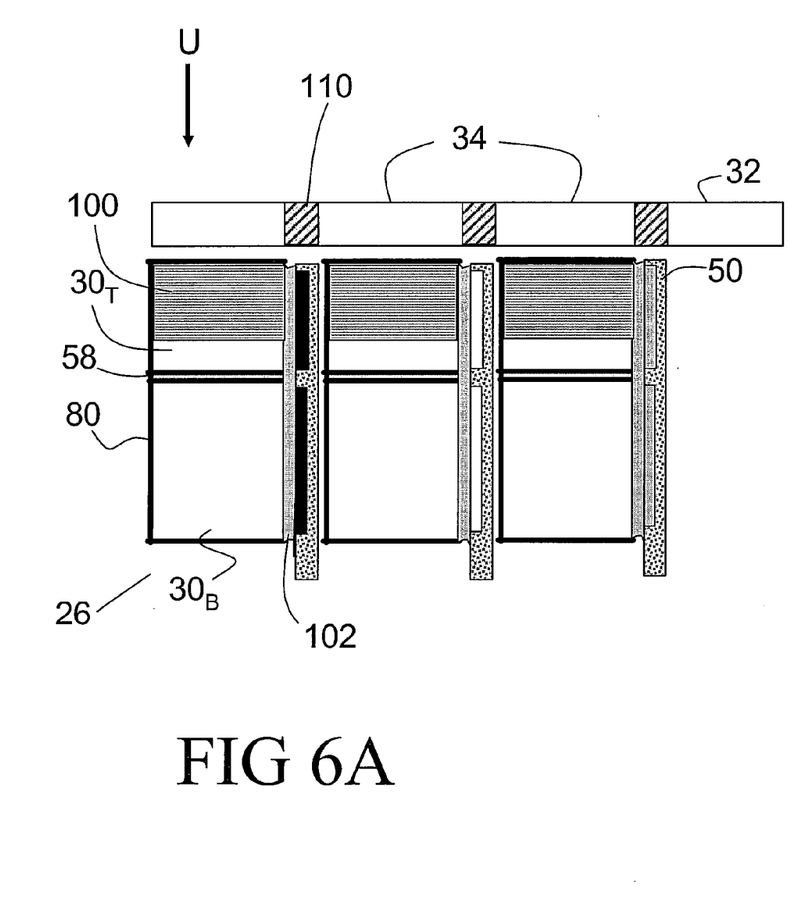
FIG. 6A diagrammatically illustrates a side view of the radiation detector with a grid.
Figure 6B:
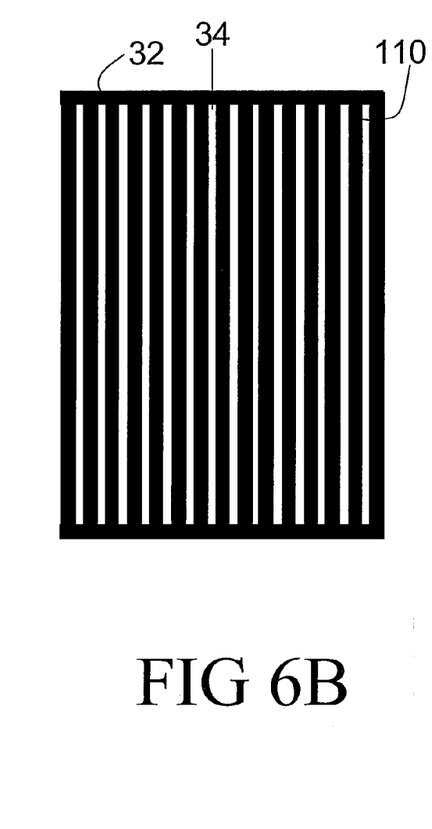
FIG. 6B diagrammatically illustrates a top view of a grid.

With reference to FIGS. 6A and 6B, the grid 32 includes legs or strips 110, which each preferably overlaps the thickness of each corresponding silicon chip 50. In this manner, the grid 32 protects silicon chips 50 from x-ray radiation. For example, if the silicon chips are about 0.125 mm thick, the legs 110 can be about 0.140 mm thick.

The invention has been described with reference to the preferred embodiments. Obviously, modifications and alterations will occur to others upon reading and understanding the preceding detailed description. It is intended that the application be construed as including all such modifications and alterations insofar as they come within the scope of the appended claims or the equivalents thereof.

The invention claimed is:

1. A radiation detector comprising:
   an upper scintillator, which is disposed with a top face facing a radiation source to receive radiation, which converts lower energy radiation into light, and which transmits higher energy radiation through a bottom face;
   an optical element, optically coupled with one of the top and bottom faces of the upper scintillator to collect the light from the upper scintillator;
   a first photodetector optically coupled to a side edge of the upper scintillator and the optical element;
   a lower scintillator, which is disposed adjacent the upper scintillator bottom face to receive the higher energy radiation transmitter through the bottom face and to convert the received higher energy radiation into light; and
   a second photodetector, optically coupled with the lower scintillator to receive and convert the light from the lower scintillator into electrical signals.

2. The radiation detector as set forth in claim 1, wherein upper and lower scintillators are optically isolated to block light from travelling between the upper and lower scintillators and wherein the first and second photodetectors are disposed adjacent and parallel to each other.

3. The radiation detector as set forth in claim 1, wherein the upper scintillator has a thickness, and the first photodetector has an active area of a height which height is substantially greater than the upper scintillator thickness.

4. The detector as set forth in claim 3, wherein the upper and lower scintillators are fabricated from gadolinium oxy sulfide (GOS).

5. The radiation detector as set forth in claim 4, wherein the upper scintillator thickness is equal to about 0.1 mm, and the height of the first photodetector active area is at least 0.65 mm.

6. The detector as set forth in claim 1, wherein the optical element is a transparent low- Z, non-scintillating material.

7. The detector as set forth in claim 1, wherein the optical element is a scintillator including at least one of:
   yttrium aluminum garnet (YAG), and
   zinc selenide (ZnSe).

8. The detector as set forth in claim 1, wherein the upper scintillator includes yttrium aluminum garnet (YAG).

9. A computed tomography scanner including an array of the radiation detectors of claim 1.

10. A detector including:
    an upper scintillator, which is disposed facing an x-ray source to receive radiation, convert lower energy radiation into light and transmit higher energy radiation;
    a first photodetector, optically coupled with the upper scintillator to receive and convert the light from the upper scintillator into electrical signals;
    a lower scintillator, which is disposed to receive the higher energy radiation transmitted from the first scintillator and to convert the transmitted higher energy radiation into light;
    a second photodetector, optically coupled with the lower scintillator to receive and convert the light from the lower scintillator into electrical signals; and
    a reflective coating disposed between the upper and lower scintillators and on surfaces of the upper and lower scintillators excluding surfaces which are optically coupled to light-sensitive areas of the first and second photodetectors, such that the upper and lower scintillators are optically isolated from each other.

11. The radiation detector as set forth in claim 10, wherein the upper scintillator is thinner than a height of the light sensitive area of the first photodiode and further including:
    an optical element optically coupled to the first photodiode light sensitive area and to the upper scintillator such that a height of the upper scintillator and the optical element taken together exceeds the height of the light sensitive area of the first photodiode and wherein the reflective coating optically isolates the optical element from the lower scintillator.

12. An x-ray imaging system comprising:
    an x-ray source; and
    a two-dimensional array of radiation detectors as set forth in claim 10.

13. A radiation detector including:
    an upper scintillator, which is disposed facing an x-ray source to receive radiation, convert lower energy radiation into light and transmit higher energy radiation;
    a first photodetector, optically coupled with the upper scintillator to receive and convert the light from the upper scintillator into electrical signals;
    an optical element, optically coupled with the upper scintillator and the first photodetector, to collect and channel the light from the upper scintillator into the first photodetector;
    a lower scintillator, which is disposed distally from the x-ray source, to convert the transmitted higher energy radiation into light;
    a second photodetector, optically coupled with the lower scintillator to receive and convert the light from the lower scintillator into electrical signals;
    one or more intermediate scintillators, which are disposed in successive layers between the upper and lower scintillators, and wherein each successive intermediate scintillator receives radiation transmitted by scintillators disposed closer to the x-ray source, converts lower energy radiation into light and
    transmits higher energy radiation; and,
    wherein said upper and lower scintillators are optically isolated from each other by a reflective coating disposed between the upper and lower scintillators, said reflective coating being disposed on all surfaces of the upper and lower scintillators excluding surfaces which are optically coupled to light-sensitive areas of the first and second photodetectors.

14. A method of manufacturing a radiation detector comprising:
    fabricating upper and lower scintillators;
    coupling an optical element to an upper scintillator;
    optically coupling the optical element and the upper scintillator to the upper photodetector;
    optically coupling the lower scintillator to a lower photodetector; and
    covering the upper scintillator and the optical element as a unit with a reflective coating except for faces of the optical element and the upper scintillator that are coupled to the upper photodetector.

15. The method as set forth in claim 14, wherein the upper scintillator has a thickness equal to about 0.10 mm, and the upper photodetector has a light sensitive face of a height equal to at least 0.65 mm.

16. The method as set forth in claim 15, wherein the upper and lower scintillators are fabricated from the same scintillation material.

17. The method as set forth in claim 16, wherein the upper and lower scintillators are fabricated from gadolinium oxy sulfide (GOS).

18. The method as set forth in claim 14, wherein the upper scintillator has a thickness and each upper photodetector light sensitive face has a height which is substantially greater than the upper scintillator thickness.

19. The method as set forth in claim 14, wherein the upper and lower scintillator and the optical element are disposed in a stack such that higher energy passes through the upper scintillator and the optical element into the lower scintillator and wherein the upper and lower photodiodes are disposed in a plane parallel to sice faces of the upper and lower scintillators and the optical element such that the upper photodiode is optically coupled to the upper scintillator and the optical element and optically isolated form the lower scintillator and the lower photodetector is optically isolated from the upper scintillator and the optical element.

20. The method as set forth in claim 14, wherein the lower scintillator includes GOS and the upper scintillator includes at least one of:
   GOS,
   CdWO4,
   ZnSe, and
   YAG.

21. A radiation detector manufactured by the method of claim 14.

22. A radiation detector comprising:
   a plurality of tiles disposed adjacently one another, each tile including:
      an array of thinner scintillators, each scintillator having a pair of faces connected by side edges, one of the faces facing an x-ray source, wherein the thinner scintillators convert lower energy x-rays into visible light and transmit higher energy x-rays through the other of the faces
      an array of thicker scintillators, each scintillator having a pair of faces connected by side edges, one of the faces disposed adjacent the thinner scintillator array to receive the transmitted higher energy x-rays from the thinner scintillator and convert the higher energy x-rays into visible light;
      a first array of photodetectors, each first array photodetector having an associated active area, each being optically coupled to a side edge of an associated thinner scintillator, for sensing visible light emitted by the thinner scintillators, wherein each first array photodetector active area is of a greater vertical dimension than a vertical dimension of the associated thinner scintillator side edge;
      a second array of photodetectors, each having associated active areas, the active areas being optically coupled to the thicker scintillators, for sensing visible light emitted by the thicker scintillators; and
      an optical element, disposed adjacent and optically coupled to each thinner scintillator and being optically coupled to the active area of a corresponding one of the first array photodetectors, for collecting light emitted by the thinner scintillators and directing the collected light unto the active areas of the first array photodetectors, such that light collection efficiency of the active areas of the first array photodetectors is increased.

23. The radiation detector as set forth in claim 22, reflective layers disposed to:
   reflect the visible light converted by the thinner scintillators back into at least one of the thin scintillators and the optical elements;
   reflect the visible light converted by the thicker scintillators back into the thicker scintillators; and
   optically isolate the thinner scintillators, the optical elements, and the first array of photodetectors from the thicker scintillators and the second array of photodiodes.

* * * * *